US011109181B2

(12) United States Patent
Carritt et al.

(10) Patent No.: US 11,109,181 B2
(45) Date of Patent: Aug. 31, 2021

(54) SYSTEM AND METHOD FOR TRACKING CHEMICAL APPLICATIONS AND PROVIDING WARNINGS REGARDING CHEMICAL EXPOSURE TIMES

(71) Applicant: Valmont Industries, Inc., Omaha, NE (US)

(72) Inventors: Andrew Carritt, Fremont, NE (US); Marvin Schulz, Omaha, NE (US); Shane Shiplet, Kennewick, WA (US)

(73) Assignee: Valmont Industries, Inc., Omaha, NE (US)

( * ) Notice: Subject to any disclaimer, the term of this patent is extended or adjusted under 35 U.S.C. 154(b) by 482 days.

(21) Appl. No.: 16/185,202

(22) Filed: Nov. 9, 2018

(65) Prior Publication Data

US 2019/0149948 A1 May 16, 2019

Related U.S. Application Data

(60) Provisional application No. 62/585,584, filed on Nov. 14, 2017.

(51) Int. Cl.
*G08B 23/00* (2006.01)
*H04W 4/021* (2018.01)
(Continued)

(52) U.S. Cl.
CPC ......... *H04W 4/021* (2013.01); *H04L 12/1845* (2013.01); *H04W 4/90* (2018.02); *G08B 21/12* (2013.01)

(58) Field of Classification Search
CPC ....... H04W 4/021; H04W 4/90; H04W 4/023; H04W 4/06; H04W 4/02; H04W 4/12;
(Continued)

(56) References Cited

U.S. PATENT DOCUMENTS 5,653,389 A 8/1997 Henderson et al.
5,668,719 A 9/1997 Bobrov et al.
(Continued)

FOREIGN PATENT DOCUMENTS

WO 2012091988 A1 7/2012
WO 2015153779 A1 10/2015

OTHER PUBLICATIONS

International Application PCT/US2018/059941 International Search Report and Written Opinion dated Jan. 28, 2019, 9 pages.
(Continued)

*Primary Examiner* — Phung Nguyen
(74) *Attorney, Agent, or Firm* — Milligan PC LLO

(57) ABSTRACT

The present invention provides a system and method for tracking chemical applications and providing warnings regarding chemical exposure times. According to a preferred embodiment, the present invention provides a method which includes the steps of: receiving chemical application data; retrieving data regarding the chemical characteristics of the applied chemicals; receiving geo-location data identifying a target application area for the applied chemicals; calculating a probable application area based on a calculation of the potential drift of the applied chemicals beyond the target application area; calculating a buffer zone around the probable application area; calculating a safety boundary around the probable application area; calculating a geo-fence for the determined buffer zone; calculating a geo-fence for the probable application area; calculating an effective period for the probable application area; receiving location data regarding a registered user; comparing the received location data against the calculated geo-fence boundaries for the determined buffer zone and the probable application area; determining whether the first user is within a determined buffer zone; transmitting a notification or warning message to the user regarding entry into the buffer zone; determining (Continued)

whether the first user is within the probable application area; transmitting a notification to the user regarding entry into the probable application area; tracking the total time the first user is within the probable application area; and transmitting a notification to the first user regarding the total time the first user is within the probable application area.

35 Claims, 4 Drawing Sheets

(51) Int. Cl.
*H04W 4/90* (2018.01)
*H04L 12/18* (2006.01)
*G08B 21/12* (2006.01)

(58) Field of Classification Search
CPC ....... H04W 4/022; H04W 4/029; H04W 4/38; H04W 4/30; H04L 12/1845; H04L 12/1895; H04L 67/18; H04L 67/12; G08B 21/12; G08B 27/006; G06Q 10/0635; G06Q 50/02
See application file for complete search history.

(56) References Cited

U.S. PATENT DOCUMENTS

| | | | |
|---|---|---|---|
| 5,704,546 A | 1/1998 | Henderson et al. | |
| 6,070,539 A | 6/2000 | Flamme et al. | |
| 8,386,283 B2 | 2/2013 | Hand | |
| 8,571,764 B2 | 10/2013 | Peterson et al. | |
| 8,886,220 B2 | 11/2014 | Lau et al. | |
| 8,928,478 B2 | 1/2015 | Vallaire | |
| 8,937,546 B1 | 1/2015 | Baron et al. | |
| 8,941,489 B2* | 1/2015 | Sheshadri | H04W 4/021 340/539.13 |
| 8,948,975 B2 | 2/2015 | Peterson et al. | |
| 9,294,874 B2* | 3/2016 | Drennan | H04W 4/90 |
| 9,386,738 B2 | 7/2016 | Peterson et al. | |
| 2003/0130795 A1 | 7/2003 | Crosby | |
| 2004/0204915 A1* | 10/2004 | Steinthal | G01N 33/0031 702/188 |
| 2008/0088434 A1* | 4/2008 | Frieder | G08B 27/001 340/539.11 |
| 2008/0094230 A1 | 4/2008 | Mock et al. | |
| 2008/0272923 A1* | 11/2008 | Breed | B60R 21/01536 340/632 |
| 2009/0099737 A1 | 4/2009 | Wendte et al. | |
| 2011/0103302 A1 | 5/2011 | Hall | |
| 2013/0105591 A1 | 5/2013 | Peterson | |
| 2014/0316692 A1 | 10/2014 | Hillger et al. | |
| 2015/0278838 A1 | 10/2015 | Rasa et al. | |
| 2016/0109569 A1 | 4/2016 | Chan et al. | |
| 2016/0157275 A1 | 6/2016 | Matthews | |
| 2016/0180060 A1 | 6/2016 | Nelson | |
| 2016/0250965 A1 | 9/2016 | Kendrick et al. | |
| 2016/0314542 A1 | 10/2016 | Vollmar et al. | |
| 2018/0120274 A1* | 5/2018 | Roseway | G08B 21/12 |
| 2019/0073618 A1* | 3/2019 | Kanukurthy | G06Q 10/0635 |

OTHER PUBLICATIONS

Kranz et al. "Using Chemigation Safely and Effectively: Training Manual" University of Nebraska—Lincoln 2008, 70 pages.

* cited by examiner

SYSTEM AND METHOD FOR TRACKING CHEMICAL APPLICATIONS AND PROVIDING WARNINGS REGARDING CHEMICAL EXPOSURE TIMES

RELATED APPLICATIONS

The present application claims priority to U.S. Provisional Application No. 62/585,584 filed Nov. 14, 2017.

BACKGROUND AND FIELD OF THE PRESENT INVENTION

1. Field of the Present Invention

The present invention relates generally to a system and method for monitoring chemicals and, more particularly, to a system and method for tracking chemical applications and providing warnings regarding chemical exposure times and alerts to persons who are at risk of exposure to a hazardous environment.

2. Background of the Invention

Chemicals are widely used in modern farming and they are commonly distributed and applied in a variety of ways. Further, such chemicals are applied in a variety of different conditions. Many of the chemicals used in modern agriculture can be harmful. This can be especially true when the exposure times are extended and repeated exposure to mixtures of chemicals occurs.

Despite the dangers and unknown risks posed by repeated exposures to farming chemicals (including pesticides, herbicides, fertilizer and compost products), there does not presently exist a system for identifying, tracking and creating warnings for chemical applicants. This is especially important because chemical applicants can be invisible, odorless and largely undetectable without the use of specialized equipment. Further, even with specialized equipment there is no presently known way to organize and track exposure times and occurrences of chemical exposure for individual farm operators or for individual chemical applicants/agents.

SUMMARY OF THE PRESENT INVENTION

To address the shortcomings presented in the prior art, the present invention provides a system and method for tracking chemical applications and providing warnings regarding chemical exposure times and occurrences of chemical exposure. According to a preferred embodiment, the present invention provides a method which includes the steps of: receiving chemical application data; retrieving data regarding the chemical characteristics of the applied chemicals; receiving geo-location data identifying a target application area for the applied chemicals; calculating an adjusted probable application area based on a calculation of the potential drift of the applied chemicals beyond the target application area; calculating a buffer zone around the probable application area; calculating a geo-fence for the determined buffer zone; calculating a geo-fence for the probable application area; calculating an effective period for the probable application area; receiving location data regarding a registered user; comparing the received location data against the calculated geo-fence boundaries for the determined buffer zone and the probable application area; determining whether the user is within a determined buffer zone; transmitting a notification or warning message to the user regarding entry into the buffer zone; determining whether the user is within the probable application area; transmitting a notification to the user regarding entry into the probable application area; tracking the total time the user is within the probable application area; and transmitting a notification to the user regarding the total time the user is within the probable application area.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
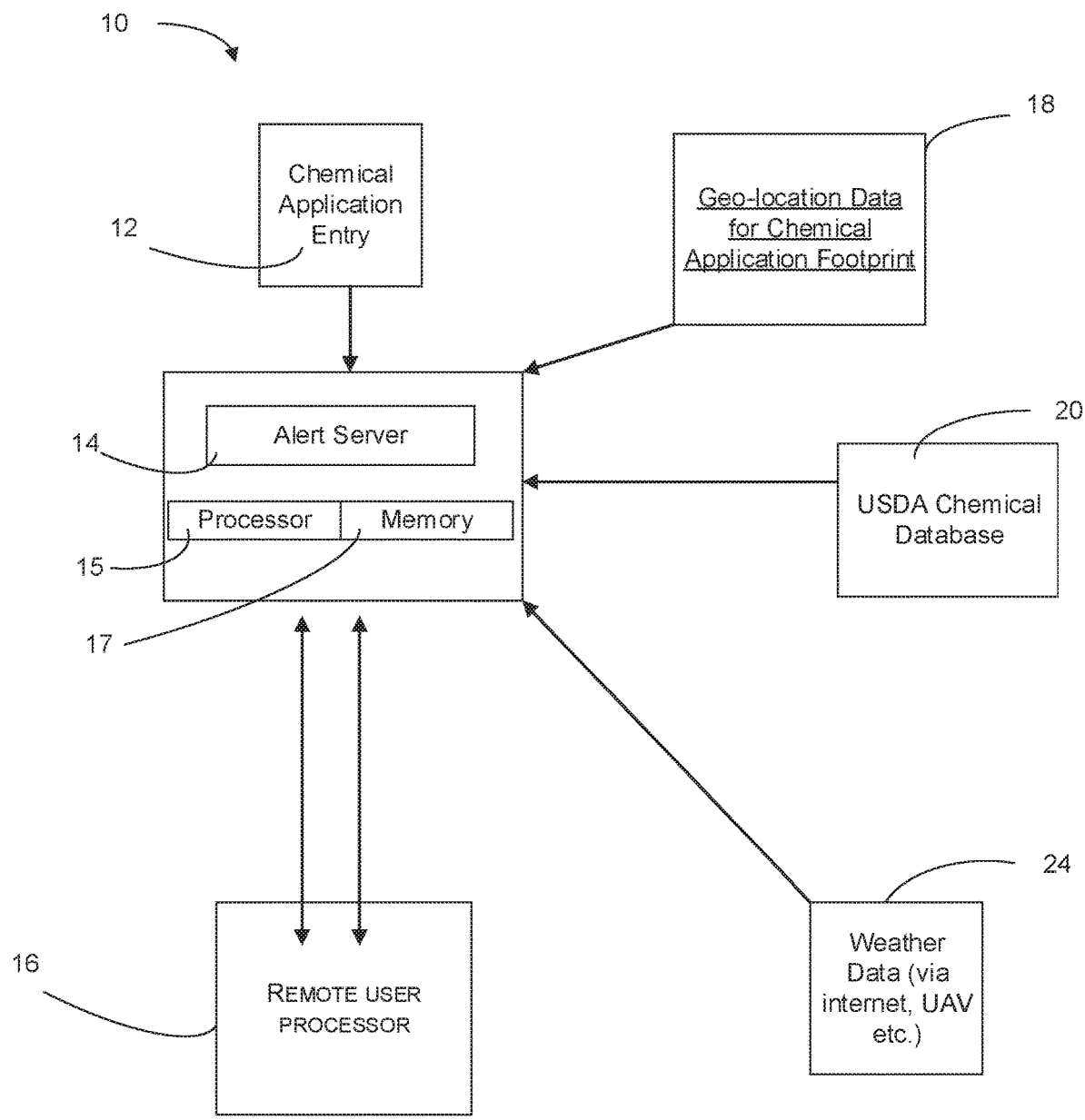
FIG. 1 shows a block diagram of a system in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," "module" and the like as used herein, are defined as a sequence of instructions designed for execution on a computer system. A program, computer program, module or software application may include a subroutine, a function, a procedure, an object implementation, an executable application, an applet, a servlet, a source code, an object code, a shared library, a dynamic link library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such as RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types.

It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to'), rather than the mandatory sense (i.e. meaning "must"). Further, where terms such as "transmit", "transmitting", "signal", "communicate" and similar terms are used, it should be understood that the terms may include the sending of signals within a device (such as between two solid-state components on the same circuit board) or between different devices (such as via a wireless or wired protocol). Methods of transmission, incorporates, but is not inclusive only to, email, text messaging, push notifications, application graphics, and application audio annunciations, whether delivered by supervisory software or triggered within the personal device carried by the user.

With reference now to FIG. 1, a block diagram illustrating an exemplary system 10 of the present invention will now be discussed. As shown in FIG. 1, the exemplary server 14 of the present invention preferably includes a processor 15 and may include any number of processors, micro-controllers, or other processing systems. The processor 15 may execute one or more software programs that implement techniques described herein. The memory 17 is an example of tangible computer-readable media that provides storage functionality to store various data associated with the operation of the server 14, such as the software program and code segments mentioned above, or other data to instruct the processor 15 and other elements of processing and control to perform the steps described herein. The memory 17 may include, for example, removable and non-removable memory elements such as RAM, ROM, Flash (e.g., SD Card, mini-SD card, micro-SD Card), magnetic, optical, USB memory devices, and so forth. Further, the memory may include links and communications with external memory storage, databases, data warehouses and the like. Preferably, the alert server 14 of the present invention may further include (either directly or through data links) interfaces to enable communication with one or more networks through a variety of components such as wireless access points, transceivers and so forth, and any associated software employed by these components (e.g., drivers, configuration software, and so on).

With reference now to FIG. 1, the alert server 14 of the present invention preferably is programed and configured to receive data from a variety of data sources and data entry points. For example, in accordance with a first preferred embodiment of the present invention, the alert server 14 of the present invention may be configured and programmed to receive chemical application data indicating the application of a specific chemical to a given field location at a specific date and time. According to a preferred embodiment, such data regarding the application of a chemical may be received from a third-party database. Alternatively, such data may be entered directly by a user or operator into the system via a user interface, either within the application or an external interface that has a connection to submit the data (i.e. an internet provided web-page or the like). Still further, such data may be entered and received from a remote user processor 16 which may for instance be a mobile computing device such as a smart phone, tablet, or laptop computer. Still further, such data may be detected autonomously by a monitoring sensor which itself is programmed to detect and report the presence of selected chemicals.

According to a further preferred embodiment, the chemical application data may preferably include data such as: chemical type, concentration, application amount, time and day of the application, location of chemical application, application method (i.e. ground, chemigation, aerial) and the like.

According to a further preferred embodiment, with the receipt of chemical application data, the alert server 14 may preferably further receive geo-location data which preferably defines the area of the chemical application. According to a preferred embodiment, the submitted geo-location data may be entered and received with an initial chemical application entry 12. According to a further preferred embodiment, the alert server 14 may preferably further supplement and refine the received geo-location data with additional GPS, longitude/latitude, metes and bounds and other location data which has been stored for a particular parcel of identified land 18. Such additional data may for instance be received and inputted from government land survey records and the like.

According to a further preferred embodiment, the alert server 14 of the present invention may preferably further communicate with and receive chemical characteristic data from a third-party resource such as, for instance, a USDA Chemical database 20, a chemical manufacturer database and/or the like. Preferably, such chemical characteristic data may preferably include updated data regarding chemical properties such as: the aerosolized weight and drift of a given chemical; the chemical lifespan of a given chemical, potential interactions with other chemicals and the like.

According to a still further preferred embodiment, the alert server 14 of the present invention may preferably further receive additional weather data 24 for a specifically defined area of chemical application. According to a preferred embodiment, such weather data 24 preferably may include weather data such as: wind speed, wind direction, humidity, sunlight levels; cloud cover, barometric pressure, precipitation events and the like. According to a further preferred embodiment, such weather data may preferably be received from several sources including: internet databases, on-site sensors, data feeds from unmanned aerial vehicles (UAVs), remote user sensors and the like.

As further shown in FIG. 1, the alert server 14 may preferably communicate with one or more remote user processors 16. According to a preferred embodiment, all data regarding the application of a chemical on a given field may preferably be linked and paired with one or more geofenced areas. Accordingly, the alert server 14 may preferably, for instance, populate and maintain a database/lookup table for any given field so that when a user is proximate to a tracked/inputted field, the user may receive information/alerts related to the field as discussed in detail below.

Figure 2:
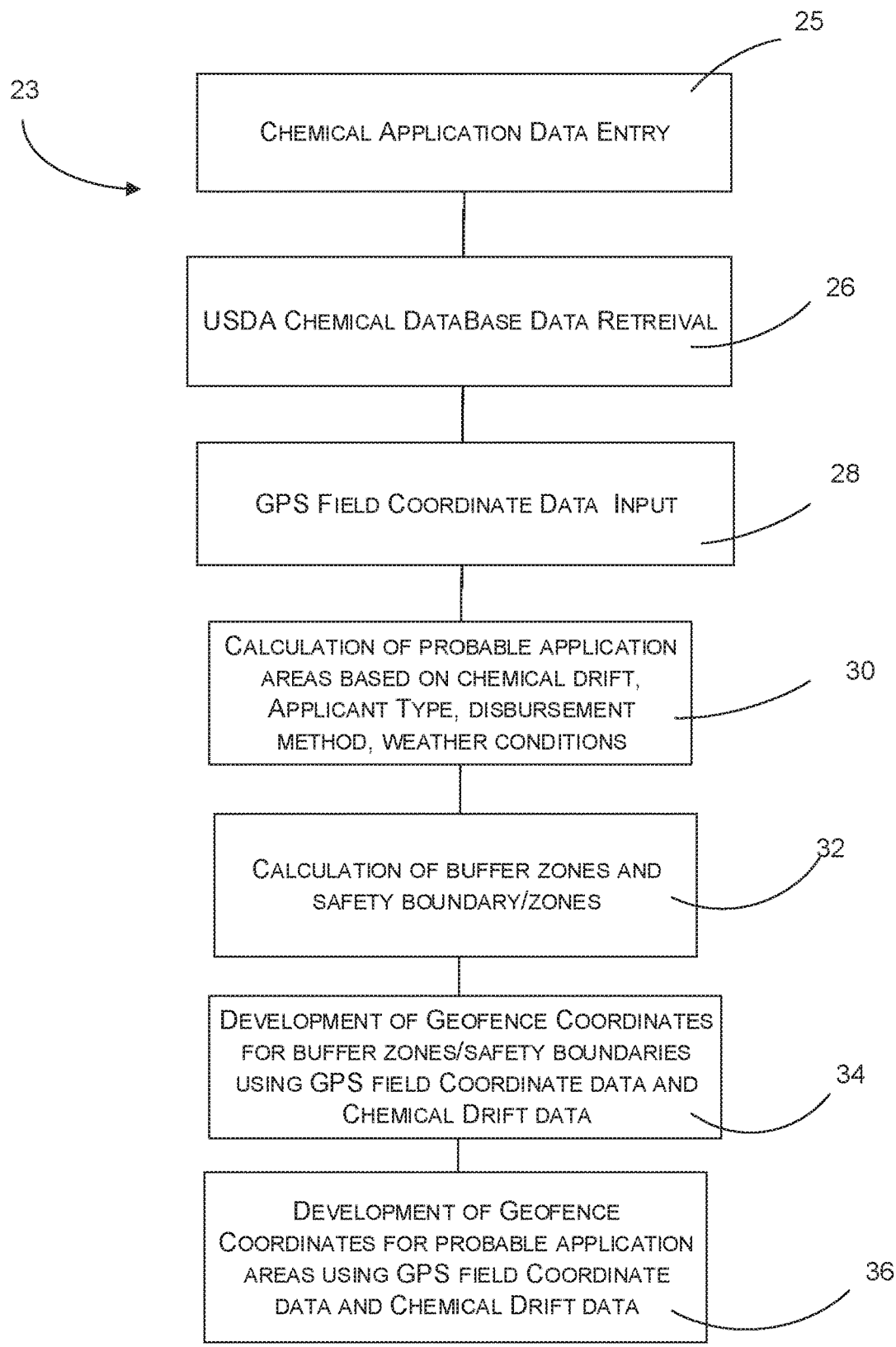
FIG. 2 illustrates a block diagram of an exemplary method for use with the present invention.
Figure 3:
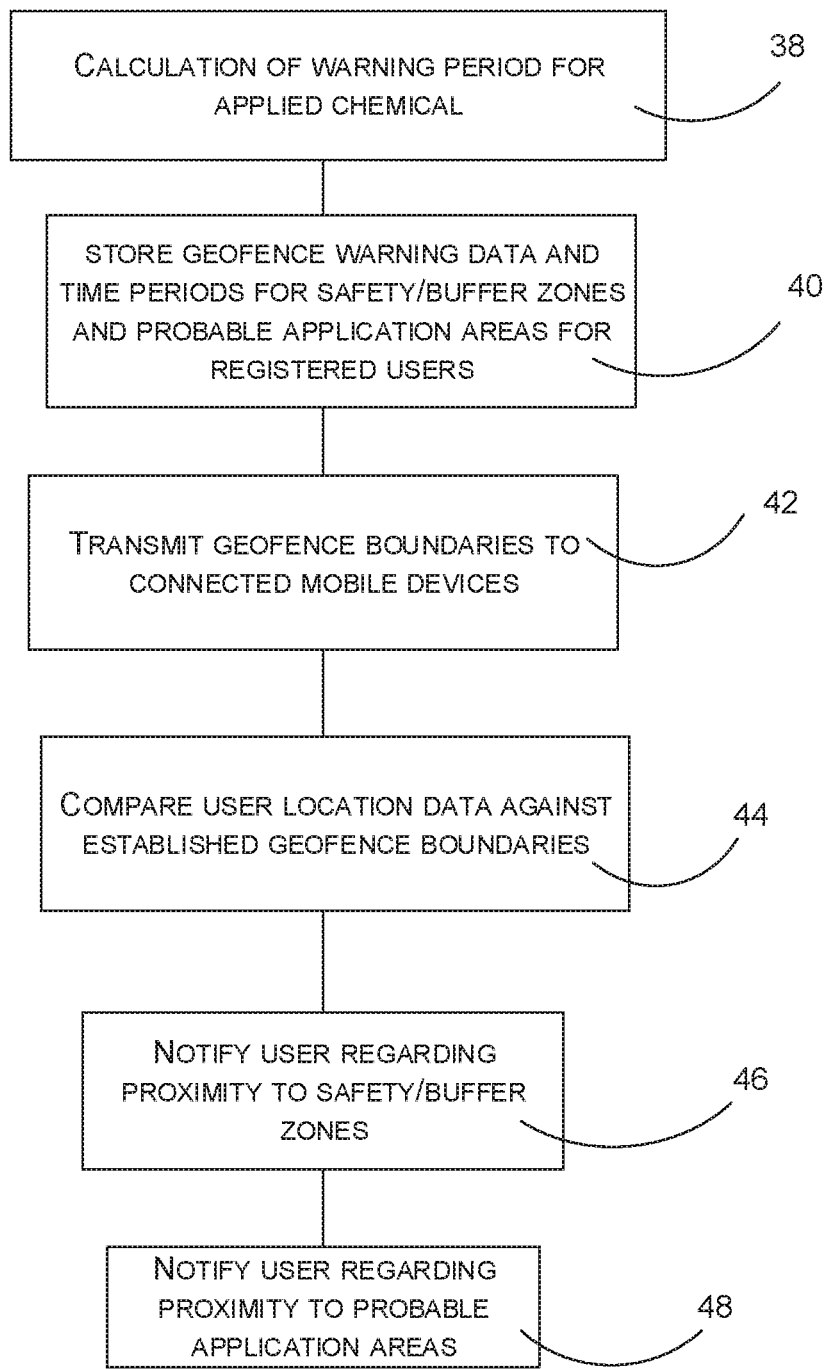
FIG. 3 illustrates a block diagram of an exemplary method for use with the present invention.
Figure 4:
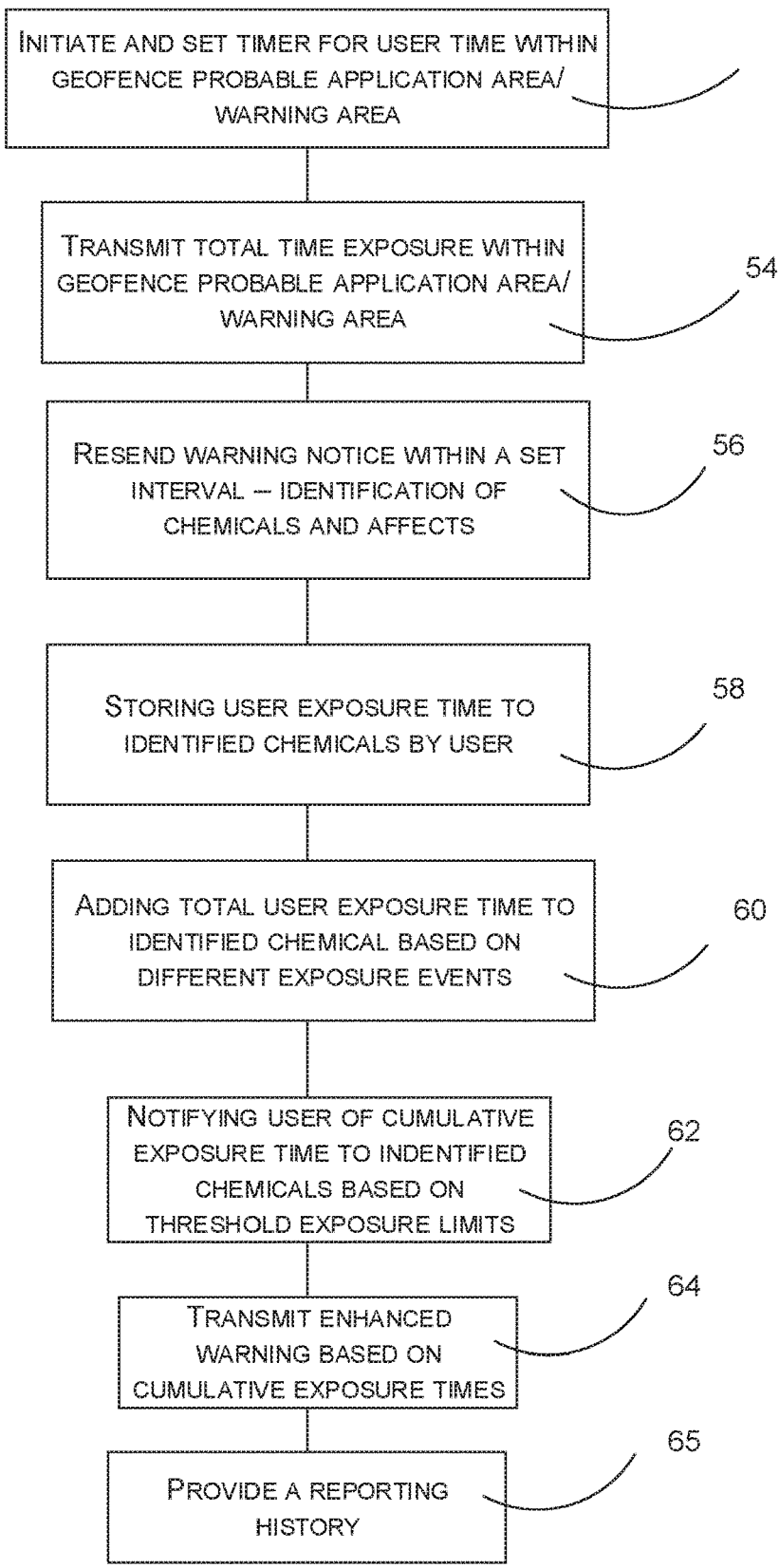
FIG. 4 illustrates a block diagram of an exemplary method for use with the present invention.

With reference now to FIGS. 2-4, exemplary methods in accordance with selected aspects of the present invention shall now be further discussed. Although the exemplary steps discussed below refer to communications between a mobile device and a server, it should be understood that the disclosed system may preferably be configured to function and perform without an active wireless connection. Accordingly, the operations and functions of the disclosed system may preferably be stored entirely within a mobile device which independently may then track locations, exposure times, geofences and violations of boundaries. Still further, the mobile device of the present invention preferably may use internal storage that can be synchronized when a given server is available and operate independently when the server is not available. Accordingly, where the present invention as discussed herein requires a given step or operation, such actions may preferably occur entirely within the mobile device without any wireless communications with a server, external data source, or network connection. Preferably, an active GPS signal or other geolocation method is used or otherwise enabled on the personal device carried by the user.

As shown in FIG. 2, an exemplary set of steps 23 are provided. In a preferred first step 25, chemical application data is preferably entered into the system. According to a preferred embodiment, the entry of the chemical application data may preferably be provided via a variety of sources including mobile computing devices such smart phones, tablets, or laptop computers. Still further, such data may be detected autonomously by a monitoring sensor which itself is programmed to detect and report the presence of selected chemicals as discussed above. Further, such data may preferably include data such as: chemical type, concentration, application amount, time and day of the application, location of chemical application, application method (i.e. ground, chemigation, aerial) and the like.

At a next step 26, the system of the present invention may preferably operate to identify and retrieve data from existing chemical databases. Such databases may preferably include USDA maintained chemical databases, chemical manufacturer databases, academic databases and/or other proprietary data sources and the like. Preferably, such chemical characteristic data may preferably include updated data regarding chemical properties such as: the aerosolized weight and drift of a given chemical; the chemical lifespan of a given chemical, potential interactions with other chemicals and the like.

At a next step 28, the system of the present invention may preferably operate to request, accept and/or otherwise receive GPS or other geo-location data identifying a given field or area of land where the identified chemical has been applied.

At a next step 30, the system of the present invention may preferably then calculate an estimated expanded application area (i.e. probable application area/warning zone) based on a calculation of the potential "drift" or "float" of the applied chemical beyond the target application area to determine and define a probable application area. According to a preferred embodiment, the calculation of step 30 may preferably be based at least in part on: the aerosolized weight and drift of a given chemical; the chemical lifespan of a given chemical, potential interactions with other chemicals and the like. According to a further preferred embodiment, the calculation of step 30 may preferably be further based at least in part on data such as environmental factors at the target application area including: wind speed, wind direction, humidity, sunlight levels; cloud cover, barometric pressure, precipitation events and the like.

At a next step 32, the system of the present invention preferably then operates to calculate buffer zones around the probable application area/warning zone. According to a preferred embodiment, the calculation of step 32 may be based at least in part on the data reviewed and produced in step 30. According to a preferred embodiment, the calculated buffer zone may preferably represent an area near to but outside of the probable application area/warning zone.

Additionally, at step 32 the system of the present invention may preferably further operate to calculate a further safety boundary/zone around the buffer zone. According to a preferred embodiment, the safety boundary/zone calculated in step 32 may preferably represent a perimeter boundary around the buffer zone which may preferably alert and provide cautions to users regarding adjacent boundary zones.

At a next step 34, the system of the present invention preferably calculates and defines geo-fences for the determined safety/buffer zone(s). At a next step 36, the system of the present invention preferably further calculates and defines geo-fence(s) for the determined probable application areas.

As further shown in FIG. 3, at a next step 38 the system of the present invention preferably calculates an active time period for the created safety/buffer zone(s) and probable application area(s) for each identified chemical applicant. According to a preferred embodiment, the calculation of step 38 is preferably determined at least in part on weather and chemical data received at steps 25-26 discussed above. At a next step 40, the system of the present invention preferably stores geo-fence data along with active time periods for each safety/buffer zone and probable application area.

At a next step 42, according to preferred embodiments, the system will preferably transmit geo-fence boundaries to connected mobile devices and may preferably synchronize zones with the mobile application. Preferably, the mobile devices (with location detection enabled), may log into the system and receive geo-fence data to allow the mobile device to self-monitor boundary crossings.

At a next step 44, the user's mobile application compares its GPS position with the geo-fence zones for detection of boundary intrusions. At a next step 46, in response to any detected boundary crossings, the mobile device carried by the user may preferably notify the user regarding proximity to a buffer/warning zone. Preferably, boundary crossings will be recorded in the mobile application and any systems receiving exception messages. According to a preferred embodiment, a minimal hysteresis is provided when sending notifications for any boundary crossings. According to further preferred embodiments, a preferred boundary crossing hysteresis algorithm preferably manages the alert notification occurrences when the user's personal device is marginally crossing between application zones, buffer zones, and safety zones. Preferably, allowing for a prescribed time, relative to the hazard specifications of the chemical present, the hysteresis regulates the frequency of alerts, while continually recording the user's position and time within a zone and the time of zone crossings, and direction of crossing. This logged data is preferably retained, providing for later synchronizing activity, uploading history to the historical data repository where it can be used for analysis and reporting, as discussed, for instance, in steps 41, 42, and 65.

According to a preferred embodiment, an exemplary notification may further include an identification of the applied chemical(s) and a list of potential harmful effects of the applied chemical(s). Further, the notification may additionally include recommendations for reducing either the exposure or its effects such as recommending appropriate clothing, hygiene, eye protection, breathing protection or the like. According to a further preferred embodiment, an exemplary notification may further include any prior exposure periods to the chemical(s) by the user as discussed below with respect to steps 62-64 below.

At a next step 48, where the system determines that a user is within a probable application area/warning zone, the system preferably will notify the user regarding their proximity to the warning zone. Included methods of notifying the user may include an audible alert, text message, email, phone call, and visual indicators. Further, the system may calculate the shortest distance/route out of the probable application area/warning zone and provide directions to the user. As with step 46, according to a preferred embodiment, an exemplary notification may further include an identification of the applied chemical(s) and a list of potential harmful effects of the applied chemical(s).

According to a further preferred embodiment, the system of the present invention may preferably further calculate a total acceptable exposure time and/or optionally provide a user with a count-down of the total acceptable exposure time remaining. Still further, the system may preferably provide supervisors and/or other designated contacts updates regarding the total exposure time remaining as well. According to a further preferred embodiment, an exemplary notification may further include any prior exposure periods to the chemical(s) by the user as discussed below with respect to steps 62-64 below.

As further shown in FIG. 4, in accordance with a further preferred embodiment, at a next step 52 the system of the present invention may preferably initiate and set a timer which tracks the amount of time that a registered user spends within a given probable application area/warning zone. According to a preferred embodiment, the system (i.e. the mobile application) preferably logs the time of entrance and exit for each distinct geofenced zone. Accordingly, a total time inside each distinct zone is preferably tracked. At a next step 54, the system of the present invention may preferably further transmit updates regarding the total time of exposure for a given user for a given chemical applicant. At a next step 56, according to a further preferred embodiment, such updates may, for instance, be transmitted at 1-30-minute intervals as may be selected by a user or program administrator.

At step 58, the system of the present invention may preferably track/store the exposure time for a given user for each exposure event. At step 60, such exposure times may preferably be tracked and added so that total cumulative exposure times for individual chemicals for each individual user may be stored and maintained. In this way, at step 62, at the end of a given time period, the system may provide warnings to the first user which include the user's total exposure time for any given time period. Accordingly, at step 64, a user may receive a warning listing a total cumulative exposure time (i.e. 24 hours over the course of a year) when a warning event is triggered. According to a further preferred embodiment, such warnings may also be initiated and transmitted to an appropriate supervisor if desired. According to a still further preferred embodiment, the system may, at step 65, provide a reporting history which may include a report of all events occurring within a given time period. According to a further preferred embodiment, each event may preferably be recorded with a date/time stamp, location data, and user information. According to a still further preferred embodiment, each event may further be sent to a selected host software location/program and stored permanently in a database. Further, each event may preferably be sent to a contact list which may preferably be managed by a designated host software administrator.

According to alternative preferred embodiments, the steps and functions of the present invention may be distributed across a variety of processing elements. For instance, selected portions of data collected by the system of the present invention 10 may be selectively distributed to a variety of independent, remote processors. For example, data collected by the system may be distributed to a remote user processor 16 for tracking, processing and executing selective steps of the present invention. Accordingly, such data may be collected, pushed or pulled by or to the remote user processor 16 (i.e. smart phone, tablet etc.) which may then initiate alerts and warning as discussed above.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. A method for tracking chemical applications and providing warnings regarding chemical exposure times, the method comprising:
   receiving chemical application data; wherein the chemical application data comprises data selected from a group of data comprising: a first chemical type, a concentration, an application amount, time and day of the application, a location of chemical application, and an application method;
   retrieving chemical characteristic data for the first chemical type; wherein the chemical characteristic data comprises data selected from a group of data comprising: an aerosolized weight and drift; a chemical life-span, and potential interactions with other chemicals;
   receiving geo-location data identifying a target application area for the first chemical type;
   calculating a probable application area based on a calculation of a potential drift of the first chemical type beyond the target application area; wherein the calculation of the probable application area is based at least in part on a factor selected from a group of factors comprising: the aerosolized weight and drift of a given chemical; the chemical lifespan of a given chemical, application method and potential interactions with other chemicals; wherein the probable application area is based at least in part on environmental factors at the target application area, wherein the environmental factors include an environmental factor selected from a group of environmental factors comprising: wind speed, wind direction, humidity, sunlight levels; cloud cover, barometric pressure; and precipitation events;
   calculating a geo-fence for the probable application area;
   calculating an effective period for the probable application area;
   receiving location data regarding a registered user;
   comparing the received location data against the calculated geo-fence boundaries for the probable application area;
   determining whether the registered user is within the probable application area; and
   transmitting a notification to the registered user regarding entry into the probable application area.

2. The method of claim 1, wherein the method further comprises retrieving chemical characteristic data from existing chemical databases.

3. The method of claim 2, wherein the existing chemical databases comprise a database selected from the group of databases comprising: USDA maintained chemical databases, chemical manufacturer databases and academic databases.

4. The method of claim 2, wherein the transmitted notification to the registered user comprises an identification of the first chemical type and at least one harmful effect of the first chemical type.

5. The method of claim 4, wherein the transmitted notification comprises a recommendation for reducing the harmful effects of the first chemical type.

6. The method of claim 5, wherein the recommendation is selected from a group of recommendations comprising: clothing, hygiene, eye protection, and breathing protection.

7. The method of claim 2, wherein the method further comprises the step of calculating a total acceptable exposure time for the first chemical type.

8. The method of claim 7, wherein the method further comprises the step of tracking the total time the registered user is within the probable application area.

9. The method of claim 8, wherein the method further comprises the step of transmitting the notification to the registered user regarding the total time the registered user is within the probable application area.

10. The method of claim 8, wherein the method further comprises the step of recording the time of a detected boundary crossing; wherein the time of the detected boundary crossing is stored for the registered user; further wherein the time of the recorded detected boundary crossings is used to create a history of chemical exposure for the registered user over time.

11. The method of claim 7, wherein the method further comprises the step of displaying a count-down of the total acceptable exposure time remaining for the registered user.

12. The method of claim 1, wherein the chemical application data is detected autonomously by a monitoring sensor.

13. The method of claim 1, wherein the effective period for the probable application area is based at least in part on one or more environmental factors.

14. The method of claim 13, wherein the method further comprises updating the effective period for the probable application area for at least one identified chemical applicant.

15. The method of claim 1, wherein the method further comprises calculating a buffer zone boundary around the probable application area.

16. The method of claim 15, wherein the geo-fence is calculated for the determined buffer zone.

17. The method of claim 16, wherein the received location data is compared against the calculated geo-fence boundaries for the determined buffer zone.

18. The method of claim 17, wherein the system determines whether the registered user is within a determined buffer zone.

19. The method of claim 18, wherein the notification is transmitted to the registered user regarding entry into the buffer zone.

20. The method of claim 15, wherein the method further comprises calculating a safety boundary around the buffer zone.

21. The method of claim 20, wherein the geo-fence is calculated for the determined safety zone.

22. The method of claim 21, wherein the received location data is compared against the calculated geo-fence boundaries for the determined safety zone.

23. The method of claim 22, wherein the system determines whether the registered user is within a determined safety zone.

24. The method of claim 23, wherein the notification is transmitted to the registered user regarding entry into the safety zone.

25. The method of claim 21, wherein the method further comprises updating the geo-fence for the determined probable application area, buffer zone and safety boundary based on one or more environmental factors.

26. The method of claim 1, wherein the method comprises transmitting geo-fence data to a mobile device.

27. The method of claim 26, wherein the method comprises comparing location data and transmitted geo-fence data on the mobile device to self-monitor boundary crossings.

28. The method of claim 27, wherein the method further comprises initiating an alert to registered users within the buffer zone or safety boundary.

29. The method of claim 28, wherein the alert comprises the notification regarding an area selected from the group of areas comprising the buffer zone and the safety boundary.

30. The method of claim 27, wherein the method comprises recording detected boundary crossings on the mobile device.

31. The method of claim 30, wherein the method comprises transmitting detected boundary crossings from the mobile device based on the frequency of boundary crossing intervals.

32. The method of claim 1, wherein the method further comprises the step of calculating the shortest route for the registered user to leave the probable application area.

33. The method of claim 1; wherein the method further comprises the step of storing a total exposure time the registered user is within the probable application area between a first given time and a second given time.

34. The method of claim 33, wherein the method further comprises adding the total time the registered user is within the probable application area over a first selected period of time.

35. The method of claim 34, wherein the method further comprises totaling and reporting the total exposure time of the registered user to each of a plurality of chemicals from a plurality of application areas over a second selected period of time.

* * * * *